G. A. KENNEDY, DEC'D.
M. KENNEDY, ADMINISTRATRIX.
LIFTING MECHANISM FOR POWER OPERATED PLOWS.
APPLICATION FILED JUNE 19, 1913.
1,224,879.
Patented May 1, 1917.
3 SHEETS—SHEET 3.
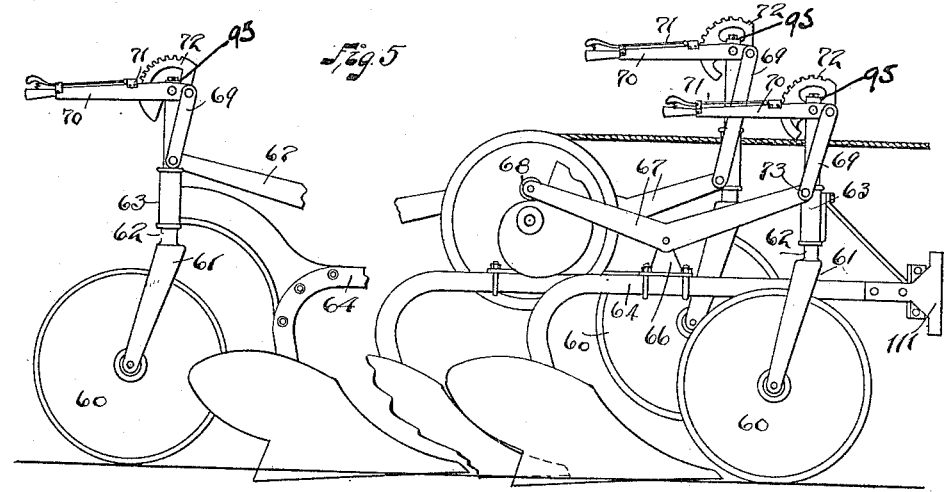
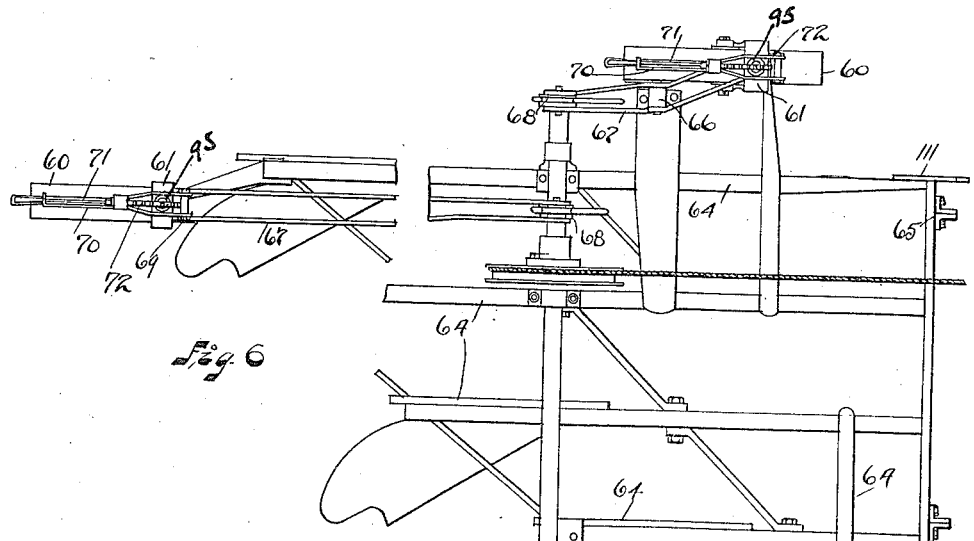
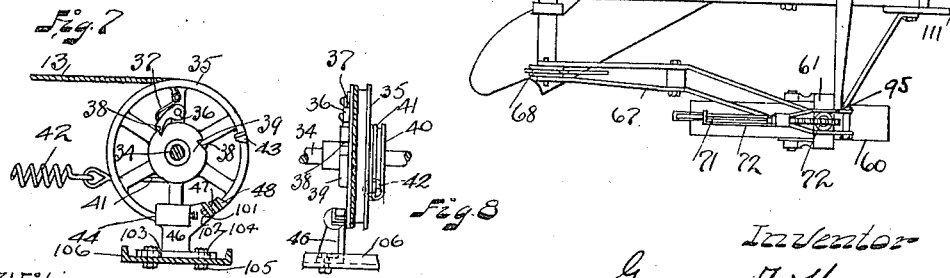

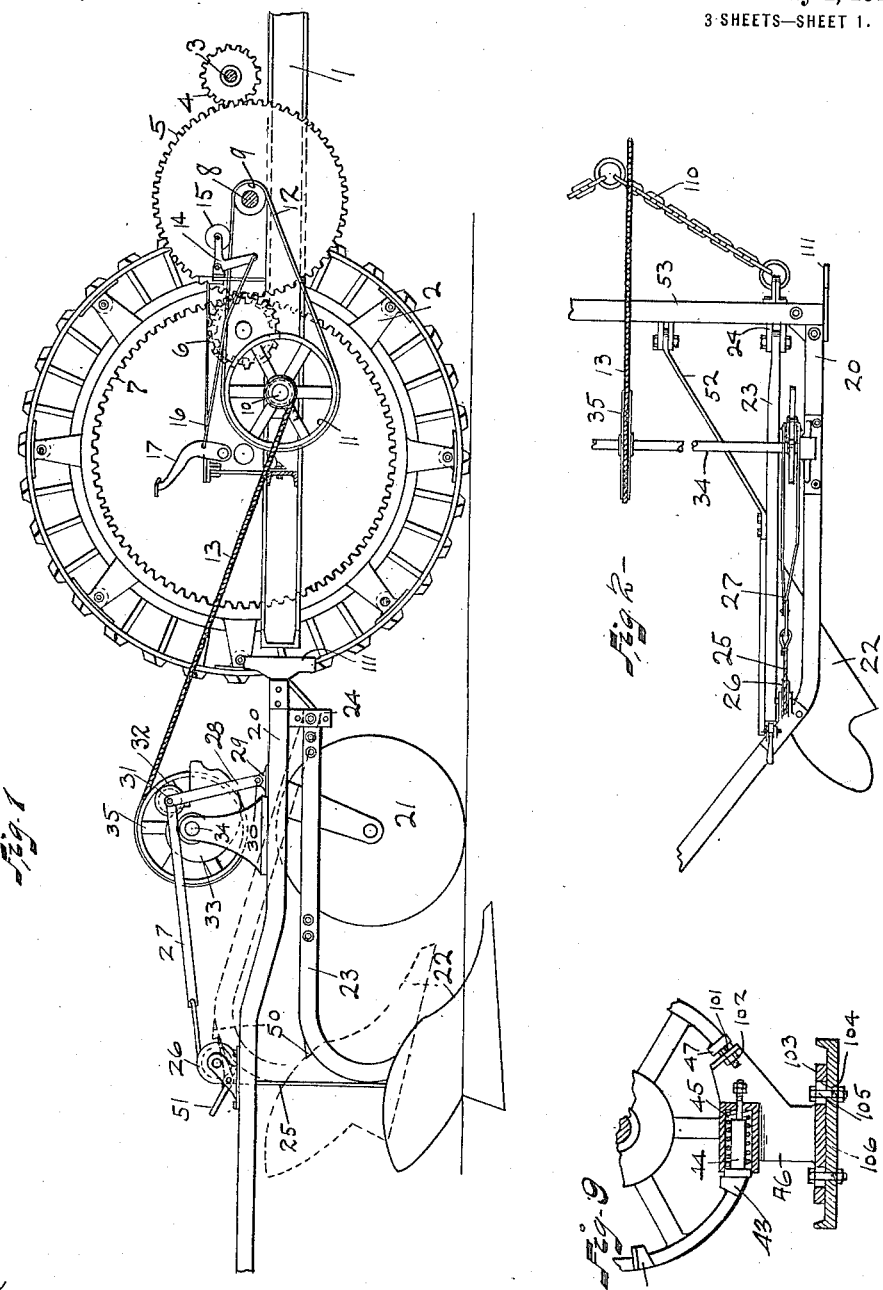

UNITED STATES PATENT OFFICE.

GEORGE A. KENNEDY, OF SANDUSKY, OHIO; MARIE KENNEDY, ADMINISTRATRIX OF SAID GEORGE A. KENNEDY, DECEASED, ASSIGNOR TO JACOB J. DAUCH, OF SANDUSKY, OHIO.

LIFTING MECHANISM FOR POWER-OPERATED PLOWS.

1,224,879.      Specification of Letters Patent.      Patented May 1, 1917.

Application filed June 19, 1913. Serial No. 774,616.

*To all whom it may concern:*

Be it known that I, GEORGE A. KENNEDY, a citizen of the United States, and a resident of Sandusky, county of Erie, and State of Ohio, have invented a new and useful Improvement in Lifting Mechanism for Power-Operated Plows, of which the following is a specification, the principle of the invention being herein explained and the best mode in which I have contemplated applying that principle, so as to distinguish it from other inventions.

The present invention relates to tractor plows, and particularly to means for raising the plows away from the ground to an inoperative position. One great difficulty in the operation of tractor plows is that once the plows are stuck it is impossible for the operator to remove them by merely moving forward and pulling them out of the ground, and it is therefore necessary to provide means for directly connecting the power means on the tractor with a lifting mechanism for raising the plows out of the ground. The present invention, then, relates to such a means and to one which is particularly simple in construction and easy to operate. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

In said annexed drawings:—

Figure 3:
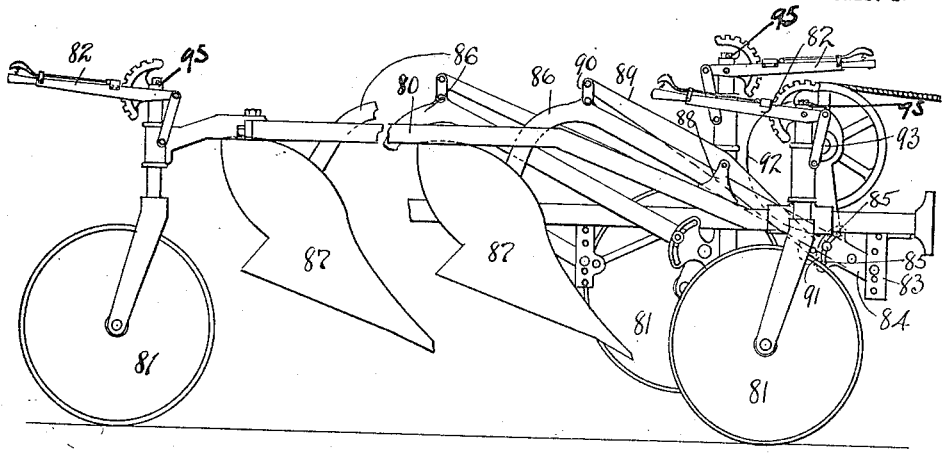
Figure 4:
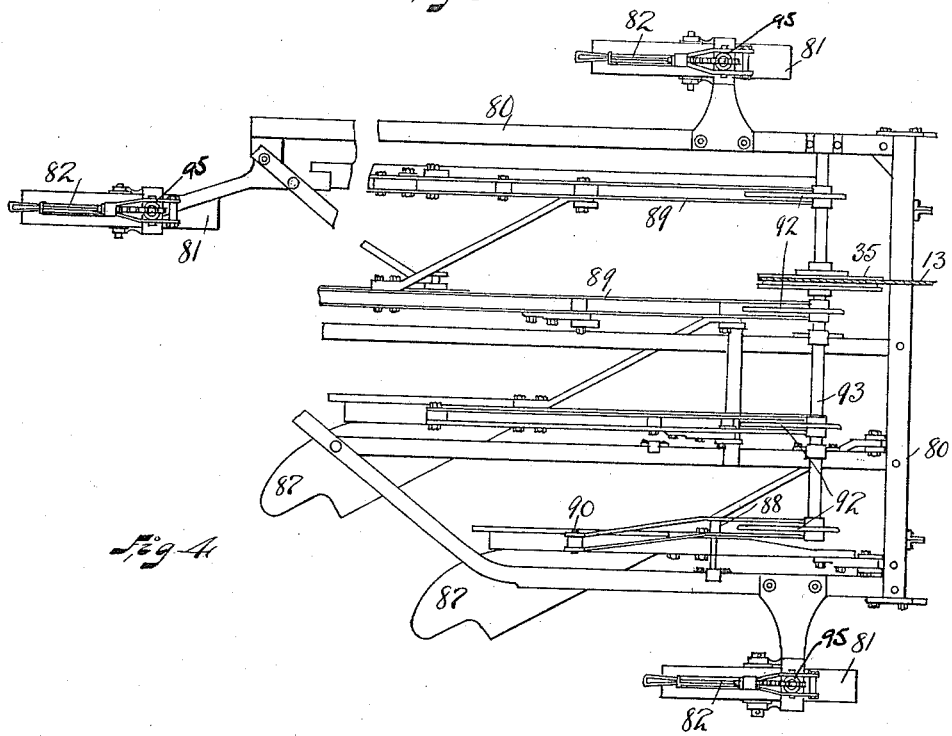

Figure 1 is a side elevation showing a tractor connected to a plow; Fig. 2 is a plan view of the plow shown in Fig. 1; Fig. 3 is a side elevation showing a slightly different plow construction together with the plow raising means as altered to coöperate with such different plow construction; Fig. 4 is a plan view of the plow shown in Fig. 3; Fig. 5 is a side elevation showing another modification of the lifting means; Fig. 6 is a plan view of the construction shown in Fig. 5; Figs. 7 and 8 are, respectively, a side elevation and an end elevation showing details of construction; and Fig. 9 is an enlarged view in section of one of such details.

In Fig. 1 there is partially shown a tractor consisting of a frame 1, traction wheels 2, the latter being driven from an engine shaft 3 by means of gears 4 and 5, such last named gear driving a smaller gear 6 which meshes with an internal gear 7 inside of the traction wheel. It will be understood that suitable transmission and differential means will be connected between certain of the shafts which are shown for the purpose of reducing the ratio between the engine and the traction wheels. The gear 5 is attached to a shaft 8, upon which there is mounted a pulley 9 and parallel with the shaft in the frame there is mounted a second shaft 10 bearing a pulley 11, pulleys 9 and 11 being connected by means of a normally slack and inoperative belt 12. Upon the shaft 10 there is wound a cable 13 which is adapted to be wound up by rotation of this shaft, such cable extending rearwardly from the tractor and being connected to suitable plow raising means which will hereinafter be described. It will be understood that any suitable engine means may be used on the tractor and also any suitable method of transmitting the power to the wheels, the present construction being shown for purposes of illustration only.

As it is often desirable to raise the plows from the ground when the tractor is stationary the cable winding mechanism is operated by a shaft which may be directly connected to the engine, as here shown, and not with the axle or shaft which is attached to the two traction wheels. Thus the shaft 8 which operates the cable winding means is preferably a transmission shaft. When the tractor is in operation the shaft 8 is rotating, but the slackness of the belt 12 prevents the operation of the shaft 10, as there is a considerable resistance to rotation on the part of this shaft, because, of course, of the weight of the plows. Pivotally mounted upon a portion of the tractor frame 1 is a bell-crank lever 14 upon one arm of which is mounted a pulley 15 adapted to engage against the upper side of the belt 12. It will be readily seen that this means constitutes the usual belt adjusting or tightening means which is in such common use, and upon forward movement of the upper arm of the bell-crank lever the pulley 15 will so tighten the belt 12 that the latter will operate the pulley 11 to wind up the cable 13.

To the lower arm of the bell-crank lever there is attached a rod 16 which is connected to a pivotally mounted foot pedal 17. The location of this pedal is of little importance, except that it is conveniently disposed adjacent to the usual position of the operator of the tractor upon the frame.

It will be understood that various types of plows may be used in connection with the plow raising means, which are here described, and to this end I have shown three different types which may advantageously be employed in this connection. Similarly, the improved plow raising means which form the subject matter of the invention may be of equal use in connection with various types of plows as will be seen from the following description. In Fig. 1 I show the preferred type of plow which I shall use, consisting of a frame 20, such frame 20 being supported upon a plurality of wheels or rollers 21 which are suitably attached to the frame. The plow frame is then attached to the tractor preferably by some compensating means which will take up slight vibrations of the frame laterally and will maintain the same in substantial alinement with the tractor, such means being described in detail hereinafter. For clearness of description and to obtain simplicity of the drawings, I have shown but one plow blade in the preferred form of plow, such blade or plow-share 22 being attached to a bar 23 which is curved and extends substantially horizontal, being attached at its forward end to a depending bracket 24 on the frame of the plow. A plurality of bolt receiving apertures are provided in both the bar 23 and the bracket 24 for adjusting the plow as may be desired. Attached to the plow shares at substantially the center is a cable 25 which passes over a pulley 26 rotatably mounted upon the frame 20 and is attached to a bar 27 which is pivotally attached to a second bar 28, the latter being oscillatorily supported upon the frame 20 by means of a lug 29 and a pin 30. Rotatably mounted upon the pin 31 which connects the bars 27 and 28, is a pulley 32, such pulley being contacted by a plate cam 33 attached to and operated by a shaft 34 which bears a pulley 35 upon which there is wound the cable 13.

Attention is now directed to Figs. 7 and 8 which show in detail the means for operating the shaft 34 and thus raising the plows.

The pulley 35 is not fixed to the shaft 34 but is provided with a lug or pawl 36 which is normally pressed inwardly by means of a spring 37 and is adapted to engage in notches 38 in a disk 39 which is attached to the shaft 34. Attached to the pulley 35 is a second and smaller pulley 40 upon which there is wound a cable 41, such latter cable being attached to a suitable resilient means in the form of a spring 42 for the purpose of returning the pulley 35 to its normal position.

It is desirable to provide means for limiting the raised position of the plows and for thus stopping further action of the cable 13, and hence I provide a stop 43 upon the periphery of the pulley 35, such stop being adapted to engage a plunger 44 which is resiliently supported by a spring 45 in a hollowed out arm or bracket 46. The interposition of the spring 45 between the plunger 44 and the bracket 46 provides a resilient stop for the pulley 35 when unwound. Rotation of the pulley 35 in the opposite direction is similarly limited by a second stop consisting of a bolt 101 having a capscrew 47 adapted to be engaged by a lug 48 attached to the pulley 35. The bolt 101 is adjustably held in an extension of the bracket 46 and is positioned by a lock nut 102. The bracket 46 has a plate 103 provided with longitudinal slots 104 engaged by bolts 105 which are held in apertures in a base 106 attached to the plow frame. By changing the position of the bracket and by adjusting the bolt 101 the pulley may be stopped at various desired points in either direction which is a considerable advantage in the initial adjustment after assembly. The present stop mechanism is but one of various forms which may be used if desired.

The action of the cam in raising the plows will be best seen from Fig. 1. The cam will be rotated in a clockwise direction by the action of the cable 13, thus forcing the pulley 32 to the right, which draws the bar 27 in the same direction and thus pulls up on the cable 25 which raises the plow shares. Any desired number of plow shares may be attached together and operated by a single cable, but it is desirable to operate one plow by a separate cable, all of the cables being operated by separate cams but the cams being operated by a single shaft which is controlled by a single pulley 35. Upon the raising of the plow shares it is necessary to support the same as the weight is considerable, and for this purpose I provide a lug 50 upon one of the bars 23, a latch 51 being pivotally mounted upon the frame 20 and adapted to engage beneath the lug in the raised position of the plow share. The general construction of the plow itself is of little importance, but attention is called to the transverse rod 52 which is pivotally attached to one of the cross bars 53 of the frame for the purpose of supporting the bar 23 against laterally swinging when in the ground.

A modified construction of the plow is shown in Figs. 5 and 6. In this construction a plurality of wheels 60 is provided, each of which carries a yoke 61 mounted upon the axle of the wheel, such yoke terminating in a shaft 62 rotatively held in a sleeve or socket 63. A plurality of plows are here connected rigidly together by means of bars 64 and cross bars 65, such bars when thus connected acting in the same manner as the frame 20 in the first construction and being directly attached to the tractor by the same means as that shown in Figs. 1 and 2. Pivotally attached to a bracket 66 on this frame is a bent lever 67 which carries a roller 68 corresponding in function to the roller 22 in the first construction, the other end of such lever being pivotally attached to a link 69, such link being attached to a hand lever 70, the latter being pinned to the shaft 62 and being provided with a lug 71 adapted to engage in notches in a toothed quadrant 72 attached to the upper end of the shaft 62. By adjusting the handle 70 the frame of the plows may be placed at any desired height above the ground, as adjustment of this hand rod raises or lowers the socket 63 on the shaft 62. As the lever 67 is pinned at 73 to the socket 63, adjustment of this socket causes adjustment of the frame of the plows, as will be readily seen.

The construction of the lifting means will be identical with that shown in Fig. 1 in so far as the construction of the pulley, the cable and the cam is concerned. Thus operation of the cam is in the same direction and causes a lifting of the roller 68, thus producing a raising of the lever 67, the latter pivoting about the pin 73 and thus raising the entire frame and plows away from the ground.

In Figs. 3 and 4 I show a second modification consisting in slightly changing the shape of the frame 80, mounting the same upon the usual wheels 81, and controlling the elevation of hand levers 82 as before. From a depending bracket 83 there is mounted a plate 84 having a curved slot 85 in which is adjustably carried one end of a bar 86 attached to the plow share 87. The plate 84 is, of course, capable of adjustment at various heights in the bracket 83 as is indicated by the plurality of bolt holes therein. Pivotally attached to a lug 88 carried on the frame 80 is a lever 89 connected to the bar 86 by a link 90. Such lever 89 is provided with a roller 91 at its other end, such roller engaging a plate cam 92 on the shaft 93, the cam being controlled in the manner already described. Upon rotation of the cam, the roller-bearing end of the lever 89 is depressed, raising the bar and plow share clear of the ground. It is unnecessary to further describe the construction shown in Figs. 3 and 4 as it is essentially like that already described.

The purpose of operating each plow or pair of plows by an individual cam is to permit of any desired timing in the raising of the plows. The latter are usually attached to the frame in a diagonal line and hence, if they are raised simultaneously, the furrows do not come to the same point. By properly timing the cams, however, the plows can be lifted successively permitting each to reach the same point in the furrow. This will generally be done although any desired timing may of course be given the cams.

The plow frame will be attached to the tractor by any suitable means, preferably flexible means such as chains 110 and is provided with a bumper 111 at either side of the front adapted to be engaged by the tractor frame, thus permitting backing. This is an important feature of the invention as it has hitherto been impossible to perform this operation without a rigid connection between plow and tractor which it is practically impossible to provide and attain good results. The present attachment is flexible but permits of backing irrespective of the height of the plows at the time, the bumpers extending for some distance vertically as may be seen.

It will be noted that the levers 70 and quadrants 72 are attached not directly to the shafts 62 but to collars 95 rotatably mounted on said shafts. This construction permits the machine to have a very short turning radius which is a feature of considerable advantage in such mechanism.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In lifting mechanism the combination with a portable support, and an element on said support adapted to be lifted; of a shaft rotatably mounted on said support, a pulley rotatably mounted on said shaft; a disk attached to said shaft; one way connections between said pulley and said disk; a cam on said shaft; two pivotally mounted bars; one of said bars contacting said cam, said bars being attached to said support and said element whereby operation of said pulley in one direction raises said element.

2. In lifting mechanism the combination with a portable support and an element on said support adapted to be lifted; of a shaft rotatably mounted on said support, a pulley rotatably mounted on said shaft; a disk attached to said shaft; one way connections between said pulley and said disk; means adapted to limit rotation of said pulley in one direction; a cam on said shaft; two pivotally mounted bars; a roller mounted on said bars at their connecting point, said roller contacting said cam, said bars being attached to said support and said element respectively whereby operation of said pulley in one direction raises said element.

3. In lifting mechanism the combination with a portable support and an element on said support adapted to be lifted; of a shaft rotatably mounted on said support, a pulley rotatably mounted on said shaft; a disk attached to said shaft; one way connections between said pulley and said disk; means adapted to limit the rotation of said pulley in both directions, a cam on said shaft; two pivotally mounted bars; a roller rotatably mounted at the connecting point of said bars, said roller contacting said cam, said bars being attached to said support and said element respectively, whereby operation of said pulley raises said element.

4. In lifting mechanism the combination with a portable support and an element on said support adapted to be lifted; of a shaft rotatably mounted on said support, a pulley rotatably mounted on said shaft; a disk attached to said shaft; one way connections between said pulley and said disk; a lug on said pulley; spaced stops adapted to be contacted by said lug, thereby limiting rotation of said pulley in either direction, a cam on said shaft; two pivotally connected bars; a roller mounted at the connecting point of said bars, said roller contacting said cam, said bars being pivotally attached to said support and said element respectively, whereby operation of said pulley in one direction raises said element.

5. In lifting mechanism the combination with a portable support; and an element on said support adapted to be lifted; of a shaft rotatably mounted on said support; a pulley mounted on said shaft; a cam attached to said shaft; two pivotally connected bars, one of said bars being pivotally attached to said support, the other being connected to the element to be lifted; a roller mounted on said bars at their connecting point, said roller contacting said cam; a cable attached to said pulley and adapted to rotate the same, rotation of said pulley in one direction being adapted to actuate said cam, thereby lifting said element.

Signed by me this 3rd day of June, 1913.

GEORGE A. KENNEDY.

Attested by—
 H. B. FAY,
 D. T. DAVIES.

Copies of this patent may be obtained for five cents each, by addressing the "Commissioner of Patents, Washington, D. C."